United States Patent [19]

Johnson

[11] Patent Number: 4,793,535
[45] Date of Patent: Dec. 27, 1988

[54] COMBINED RACK AND CARRIER FOR SURFBOARD

[76] Inventor: Donald Johnson, 1000 Ocean Drive, #4, Oxnard, Calif. 93035

[21] Appl. No.: 72,652

[22] Filed: Jul. 13, 1987

[51] Int. Cl.$^4$ ............................ B60R 9/04; A45F 4/00
[52] U.S. Cl. .................................. 224/329; 150/52 R; 224/151; 224/153; 224/328; 206/315.1
[58] Field of Search ............... 224/151, 153, 209, 329, 224/318, 324, 328, 917; 206/315.1; 294/147; 383/4, 103; 150/52 R

[56] References Cited

U.S. PATENT DOCUMENTS

| 1,479,903 | 1/1924 | Erland | 383/4 X |
|---|---|---|---|
| 2,454,608 | 11/1948 | Meyerdick | 224/328 X |
| 3,339,607 | 9/1967 | Howard | 224/917 X |
| 3,938,716 | 2/1976 | Jackson et al. | 224/209 X |
| 4,007,862 | 2/1977 | Heftmann | 224/329 |
| 4,050,614 | 9/1977 | Simpson | 224/328 |
| 4,402,442 | 9/1983 | Martino | 224/324 |
| 4,483,380 | 11/1984 | Beran | 150/52 R |
| 4,655,343 | 4/1987 | Lane et al. | 224/153 X |

FOREIGN PATENT DOCUMENTS 2490597 3/1982 France .................... 224/318

Primary Examiner—Henry J. Recla
Assistant Examiner—Robert Petrik
Attorney, Agent, or Firm—Milton S. Gerstein

[57] ABSTRACT

A sack for carrying and transporting a surfboard which sack may be used in its first form as a back-pack carrier for the surfboard, and in its second form as a roof-rack for transporting the surfboard by a vehicle. Four strap portions are provided having either a male coupler or female coupler at its free end. Each free end also has associated with it a hook for attaching the sack to the rain gutters of the roof of a vehicle. Length adjusters are provided for adjusting the length of the band to one end of which is attached the hook for the rain gutter. A pouch is also provided on each strap portion for storing the hook and its band during non-use. A zipper-closure is provided at the tail end portion of the sack to allow for storage of two surfboards in the sack. A separate compartment is provided for storing personal belongings. The outer portion of the sack has a portion provided with a mesh in order to ventilate the interior of the sack.

16 Claims, 4 Drawing Sheets

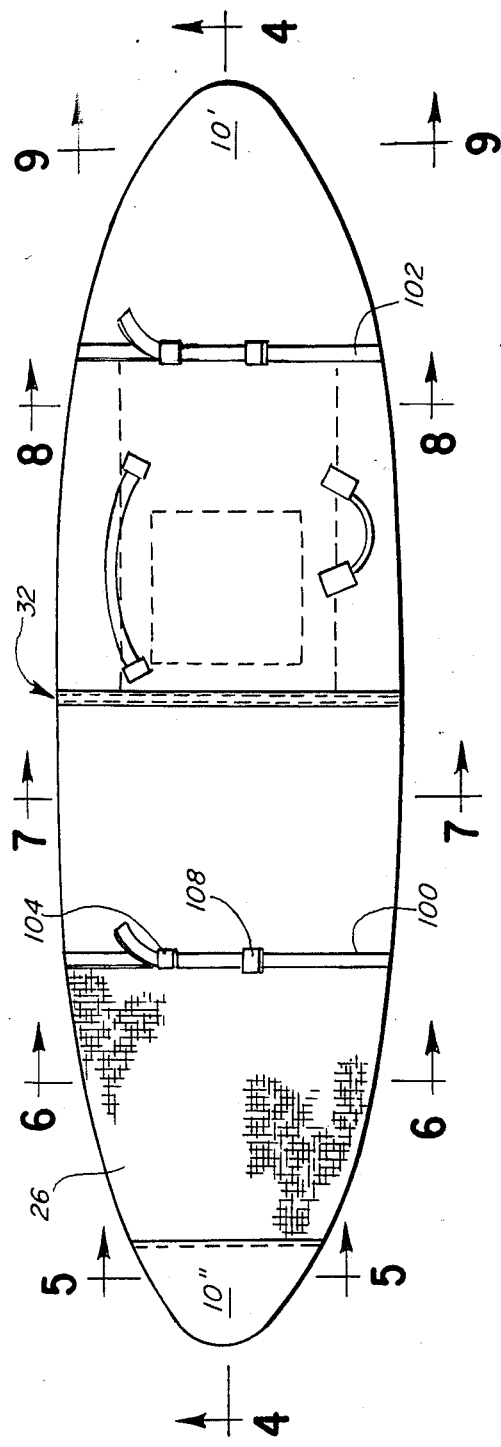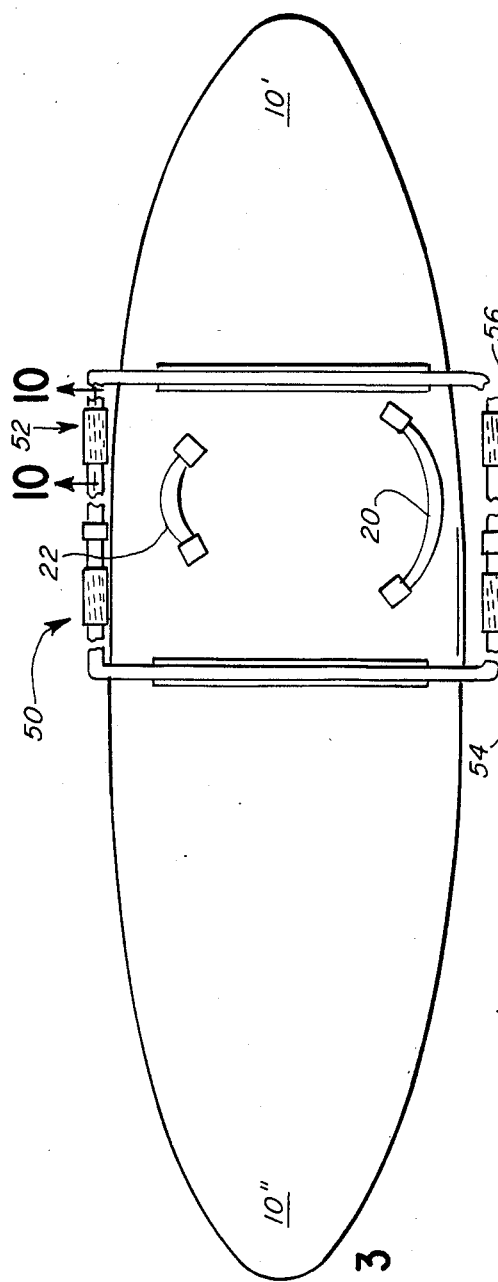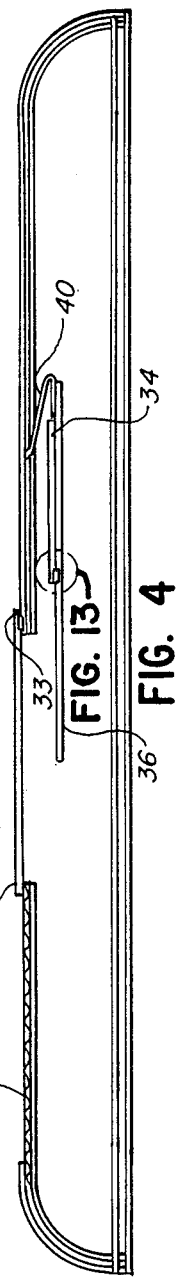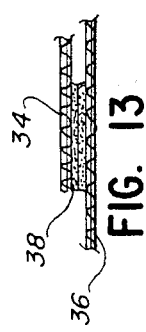

COMBINED RACK AND CARRIER FOR SURFBOARD

The present invention is directed to a sack for a carrying a surfboard, which sack may be used in a plurality of ways so that the surfboard may be carried in back-pack style, or over-the-shoulder, with the sack also being useable as a rack for mounting upon the roof of an automobile, or the like, for transporting the surfboard. Prior-art surfboard sacks or bag-carriers allow for the carrying of the surfboard contained therein in an over-shoulder-type of manner. All prior-art surfboard bag-carriers do not allow for use of the bag-carrier itself as a rack for mounting the surfboard on the roof of a vehicle for subsequent transport to a beach, or the like. Typically, the surfboard itself or the bag-carrier must be placed on a conventional type of car rack on the roof of the vehicle.

SUMMARY OF THE INVENTION

It is the primary objective of the present invention to provide a bag or sack carrier for a surfboard that allows not only for the carrying by hand or shoulder of the surfboard via the sack, but also allows for the transport thereof by mounting the sack itself to the roof of a vehicle, whereby the sack serves the function of a roof-rack.

It is another objective of the present invention to provide a bag or sack carrier for a surfboard that allows for easy and quick transformation of the sack carrier from one mode of use to another, whereby the sack carrier may be easily and readily converted from a back-pack type of carrying to over-the-shoulder type of carrying to the transformation of the sack-carrier itself for serving as a rack on the roof of a vehicle.

It is another objective of the present invention to provide such a transformable sack-carrier that ensures that the surfboard contained therein is safe and free from damage by providing ample and appropriately-placed protective padding sandwiched between two layers of fabric constituting the shell of the sack carrier.

It is yet another objective of the present invention to ensure that the fin of the surfboard is properly and more adequately protected in the sack carrier by providing a pocket area in the rear, tail portion of the sack carrier, in which pocket may be inserted not only items needed to be carried, but items of a material to provide additional cushioning and padding protection.

It is another objective of the present to provide a double sack carrier by which a pair of surfboards may be carried and/or transported, with the sack-carrier having a pair of longitudinally-extending inner chambers for the two surfboards between which chambers is provided a layer of padding.

It is also an objective of the present invention to provide a sack carrier for at least on surfboard which includes a mesh portion formed in the forward area thereof by which the interior of the sack carrier may be ventilated.

Toward these and other ends, the bag or sack carrier for surfboards is made of a shell of a double layer of nylon which sandwiches therebetween a layer of padding for protecting the contents of the bag. The bag proper has a pair of exterior carrying handles for holding the bag by the hands. There are also provided a pair of shoulder straps, each shoulder strap consisting of a pair of elongated portions having cooperating male and female connectors, so that a portion of one shoulder strap which has a male connector at its end may be connected to the portion of the other shoulder strap having a female connector at its end, and vice versa, so that the bag may be readily and easily converted to a back-pack type of carrying sack.

Each male and female connector is also provided with a special rack-attachment adapter by which the sack carrier may be converted into a rack for mounting to the roof of an automobile for subsequent transport. Each adapter includes a hook end for attachment to the rain gutter on each side of the roof of the automobile, so that the surfboard sack carrier is readily convertible to a roof-rack.

BRIEF DESCRIPTION OF THE DRAWING

The invention will be more readily understood with reference to the accompanying drawing, wherein:

FIG. 2 is a top view thereof;

FIG. 3 is a bottom view thereof;

FIG. 4 is a cross-sectional view taken along line 4—4 of FIG. 2;

FIG. 13 is a detail view showing the end of a strap portion with attached rain-hook and strap-length adjusting means.

DETAILED DESCRIPTION OF THE INVENTION

Figure 5:
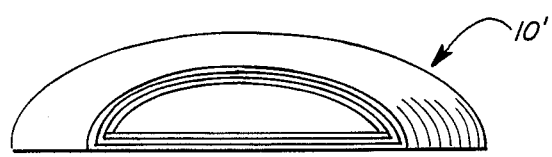
FIG. 5 is a cross-sectional view taken along line 5—5 of FIG. 2.
Figure 8:
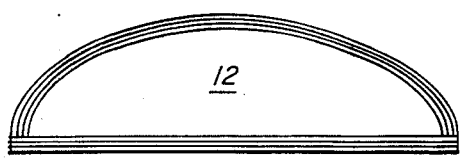
FIG. 8 is a cross-sectional view taken along line 8—8 of FIG. 2.
Figure 6:
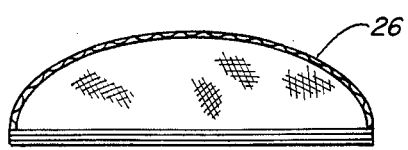
FIG. 6 is a cross-sectional view taken along line 6—6 of FIG. 2.
Figure 9:
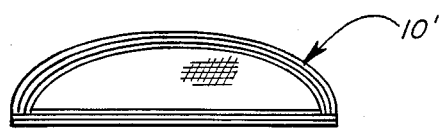
FIG. 9 is a cross-sectional view taken along line 9—9 of FIG. 2.
Figure 7:
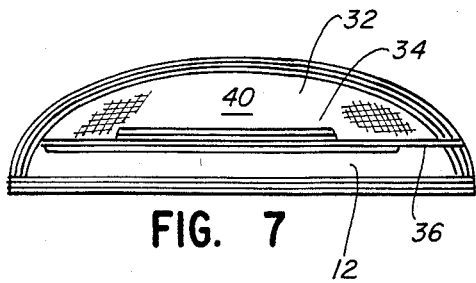
FIG. 7 is a cross-sectional view taken along line 7—7 of FIG. 2.
Figure 10:
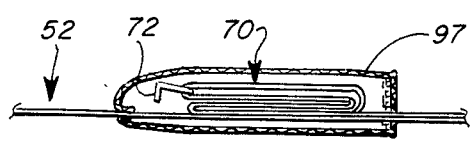
FIG. 10 is a cross-sectional view taken along line 10—10 of FIG. 3.
Figure 11:
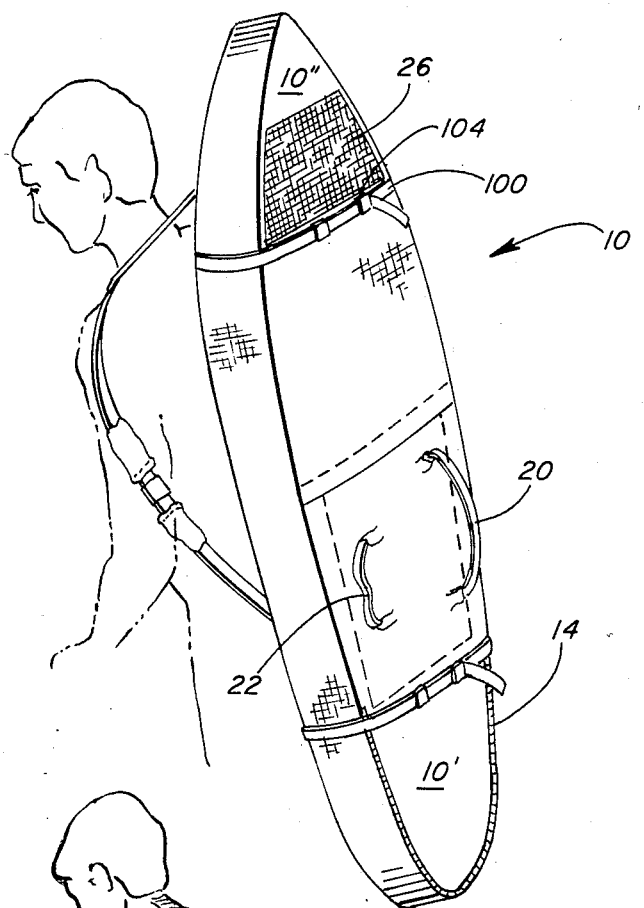
FIG. 11 is a pictorial view showing the sack of the invention carried in back-pack style.
Figure 12:
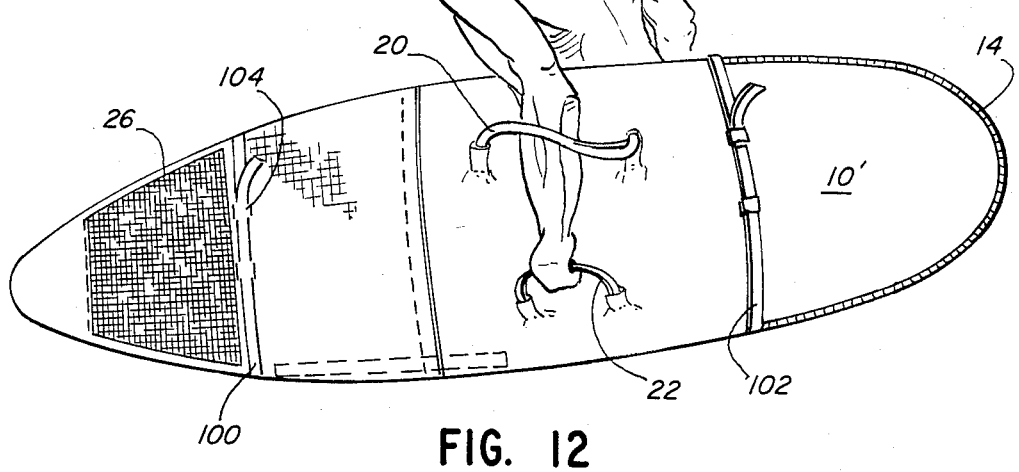
FIG. 12 is a pictorial view showing the sack of the invention carried by hand.

Referring now to the drawings in greater detail, the sack-carrier for carrying and transporting a surfboard, or the like, is indicated generally by reference numeral 10. The sack-carrier 10 is a generally oblong-shaped product preferably made of an outer shell of nylon or dacron, and an inner shell also of nylon or dacron, with a middle layer of protective padding made of ensolyte or bubble-pack, or the like. The materials are so chosen so as to permit the sack of the invention to serve not only as a carrier, but also as a container by which a surfboard may be shipped and transported. The sack-carrier 10 defines a hollow interior 12 as shown in FIGS. 7 and 8 in which is stored a surfboard, or the like. Access to the interior 12 is provided by a zipper-closure member 14 (FIGS. 11 and 12) provided in the tail-portion 10' of the sack-carrier 10 as shown in FIGS. 2 and 9. The tail-portion is rounded and is designed to receive therein the tail-fin of a surfboard. The upper surface of the sack-carrier 10 is provided with a pair of hand-carrying loops or straps 20 and 22, with the strap 20 being longer than the strap 22. Either of the loops 20, 22 may be used to carry the sack-carrier 10 by hand, as shown in FIG. 12. Thus, the first manner by which the sack-carrier 10 with enclosed surfboard therein may be carried is by a hand, as shown in FIG. 12. As will be explained below, there are a plurality of other manners by which the sack-carrier 10 may be carried and transported. The sack-carrier 10 also has a front, nose-portion 10" in the interior of which is received the nose of a surfboard. The nose-portion 10" as best seen in FIGS. 2, 4 and 5, is provided with a mesh 26 as shown in FIGS. 2, 4 and 6 that allows for the ventilation of the interior of the sack-carrier 10. The mesh, made of any suitable material such as nylon, interrupts the general pattern of the shell layers, so that the shell of the sack-carrier 10 at the region of the mesh is not provided with the three layers described above. The sack-carrier 10 is also provided with an interior pocket area 32 shown in FIG. 7, which is accessed by a closure flap 32', which is reclosable by mating hook-and-pile fastening elements 33 as shown in FIG. 4. The pocket area 32 may be used for storing items, such as bathing suits, and the like. Within this pocket area 32, there is also provided an inner, secret compartment defined by a closure flap 34 which is reclosable with respect to the lateral extending layer 36 constituting the bottom of the pocket-area 32. Mating hook-and-pile fastening elements 38 (see FIG. 13) allow for the opening and re-closing of this secret compartment. The layer 36 preferably extends the full width of the sack-carrier, which width is taken in a direction perpendicular to the length of the sack-carrier, the length being from nose portion 10" to tail-portion 10'. The pocket 32 has a rearward-most wall defined by a nylon layer 40, which extends the full width of the sack-carrier. Each edge surface of the layers 36 and 40 are appropriately attached to the inner side surfaces of the sack-carrier by any well-known method. The pocket 32 also serves the purpose of allowing for added cushioning to the surfboard by the emplacement of suitable padding therein.

Figure 1:
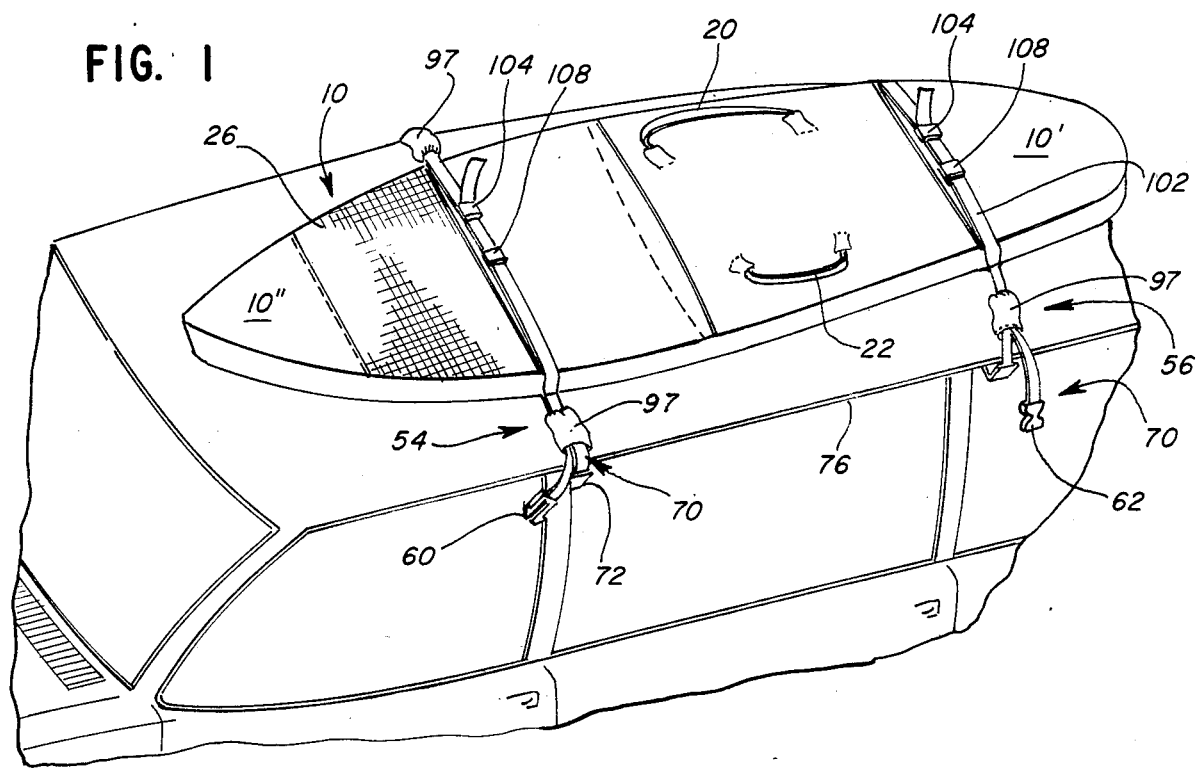
FIG. 1 is a perspective view showing the surfboard sack of the invention mounted to the roof of a vehicle in order to serve in its capacity as a roof-rack.

The sack-carrier 10 of the invention is provided with carrying straps defined by strap portions 50, 52 and 54, 56. The strap portions each have a first end that is affixed to a respective portion of the shell on the underside of sack-carrier. Each of strap portions 50 and 54 has at the second, free end thereof a male coupling element 60, best seen in FIG. 1, while each of the strap portions 52 and 56 has at the second, free end thereof a female coupling element 62. Thus, the strap portions 50 and 52, and the strap portions 54 and 56 are interconnectable to form a pair of elongated straps, so that the sack-carrier 10 may be carried in back-pack style, as shown in FIG. 11. Similarly, the elongated straps may be formed by interconnecting the strap portions 50 and 56, and the strap portions 52 and 54, so that the elongated straps thus formed criss-cross in front of the person to add a greater degree of safety in order to prevent the falling off of the sack-carrier 10 from the shoulders. Also in accordance with the invention, each strap portion 50, 52, 54 and 56 also includes a secondary strap element 70 at the free end of which is provided a hook 72 for attachment to the rain gutter 76 of a vehicle, as shown in FIG. 1. The hooks 72 allow for the use of sack-carrier 10 as a roof-rack for transporting the surfboard, or the like, via a vehicle, thereby obviating the need of a separate rack for the surfboard.

Figure 14:
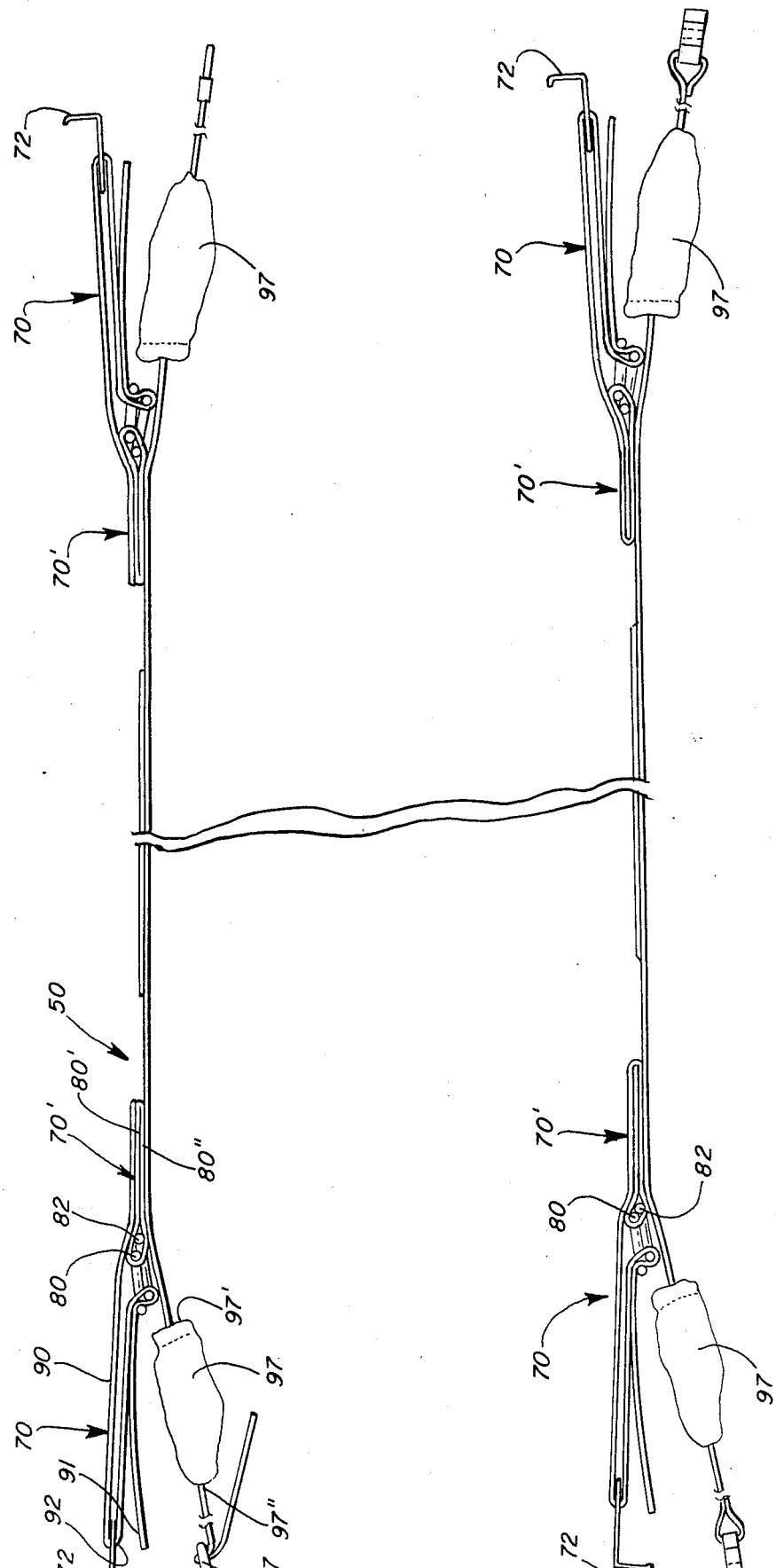
FIG. 14 is a detail view of the strap portions of the sack carrier.

In order to add additional strength, the strap portions 50, 52, 54, and 56, are interconnected by reinforcing straps 71, 73 stitched to the outer shell on the bottom surface face thereof, as shown in FIG. 3. Additional strength may also be provided by a reinforcing strap 75 on the front surface shell. Each strap portion 50, 52, 54 and 56 is also adjustable in length so as to accomodate different persons. Such adjustability is achieved by a conventional length-adusting bracket member 77 (FIG. 14). Each secondary strap element 70 is also adjustable in length via a pair or circular adjusting retaining rings loops 80, 82. In FIG. 14, it is shown that the secondary strap 70 has a first fixed portion 70' which is fixedly attached, as by stitching, to a portion of the strap portion associated with it. This strap portion 70' is first threaded through both loops 80, 82 and then stitched again to form lengths as shown by reference numerals 80', 80". The strap length 80" is then again doubled over the strap length 80' and greatly extended so that it also becomes doubled over as defined by lengths 90, 92. The lower length 92 is threaded through the very same loops 80, 82 in the manner shown in FIG. 14, with the free end 91 thereof extended in a direction toward the hook 72, which hook 72 is placed at the juncture of the two strap lengths 90, 92. In this manner, the hook 72 may be adjusted relative to the distance from the loops 80, 82, so that any-sized width of a vehicle may be accomodated, so that opposing hooks 72 may be firmly gripped to parallel, opposing rain gutters of the vehicle on the roof thereof. Thus, extremely strong attaching of the sack 10 to the roof of a vehicle may be achieved, with the doubled-over strap lengths adding increased strength and integrity to the strap system. When the sack 10 is used in its capacity as a carrier for the surfboard in back-pack style, the strap lengths 90, 92, as well as the loops 80, 82, may be stored in a nylon pouch 97 sewn at its closed end to the respective strap portion adjacent the second, free end thereof, as shown in FIG. 13. Each pouch 97 has an enlarged open mouth 97' through which passes the strap lengths 90, 92, hook 72 and loops 80, 82 when it is desired to store them in the pouch. Each pouch is secured to its respective strap portion such that the strap portion passes entirely through the pouch with the end 97" thereof stitched to both sides of the respective pouch, with the respective strap portion exiting through the open mouth of the pouch, in the manner clearly shown in FIG. 14.

The sack of the invention may be provided without any padding, so that it would comprise a simple outer skin layer. This would be preferable when there is no concern about damage to the board. The outer skin may also be made of other material besides nylon. The sack carrier when used as a rack may be attached to the trunk of the vehicle instead of the roof, and when the vehicle does not have any rain gutters, the sack carrier may be attached to the doors of the vehicle instead. The sack carrier may also be used for carrying and transporting water skis, wave skis, sail baords, luggage, rubber boats, etc. The sack is also provided with a pair of cinch straps 100, 102, one in the front and one in the rear approximately 18 inches from the respective end of the sack. These cinch straps are used to tightly grip widthwise as well as for use in attaching a second or third board on top of the sack. Each strap 100, 102 is also provided with a pair of male-female connectors at the ends thereof similar to each strap portion 50, 52, 54, 56. Thus, these cinch straps may be used for holding another board therein. Each strap 100, 102 is also adjustable to alter its length to hold the additional board tightly, as well as to draw tightly the sides of the sack to draw the sides together to provide a tight fit for the contents of the sack. The adjusting mechanism is conventional and shown by reference numeral 104 in the drawing. The male-female connector ends of the straps 100, 102 are shown by reference numeral 108.

The sack-carrier of the invention may also be modified so as to receive two surfboards, or the like. In such a modification, there is provided in the interior of the sack-carrier a separator-layer made of nylon, or the like, extending part of the length and the full width of the interior of the sack-carrier, to thus divide the interior into two compartments for storing two surfboards. The zipper-opening 14 is so positioned at the tail portion of the sack-carrier so as to allow access to either compartment in the dual-compartment version of the invention. The length of the separating layer terminates proximate to the ends of the zipper-closure.

While a specific embodiment of the invention has been shown and described, it is to be understood that numerous changes and modifications may be made therein without departing from the scope and intent of the invention as set out in the appended claims.

What is claimed is:

1. A sack carrier for surfboards, and the like, comprising:
   a main storage bag comprising an outer shell and defining a hollow, interior chamber in which may be stored a surfboard, or the like, said bag also having a front end and a rear end in which rear end a tail-end of a surfboard is positionable;
   a first strap means, and a second strap means for carrying the bag and for securing;
   each of said first and second strap means comprising a first elongated strap portion having a first end affixed to a first portion of said outer shell and a second end comprising one of a male-coupling means and a female coupling means, and a second elongated strap portion having a first end affixed to a second portion of said outer shell and a second end comprising the other of a male coupling coupling means and a female-coupling means;
   each of said second ends of each of said first and second strap portions comprising a hook means for attaching the respective said second end to a portion of a roof gutter of a vehicle, so that said bag means may be used as a vehicular roof-rack for transporting a surfboard, or the like therein;
   said hook means of each of said strap portions comprising a hook, and a secondary strap, said secondary strap having a first end affixed to the respective said second end, and said secondary strap having a second end to which is affixed said hook.

2. The sack according to claim 1, wherein said first and second strap portions are substantially located on the same side of said outer shell; said first end of said first strap portion lying closer to one end of said bag, and said first end of said second strap portion lying closer to the other end of said bag.

3. The sack according to claim 1, further comprising at least one hand-carrying strap fixedly connected to the outer surface of said outer shell by which said bag may be carried by a hand; and said outer shell comprises padding for protecting the contents of the bag.

4. A sack carrier for surfboards, and the like, comprising:
   a main storage bag comprising an outer shell layer and defining a hollow, interior chamber in which may be stored a surfboard, or the like, said bag also having a front end and a rear end in which rear end a tail-end of a surfboard is positionable;
   strap means for carrying and transporting the bag with its contents;
   said outer shell comprising at least one water-resistant layer, said at least one layer having a void area, said outer shell also comprising a mesh portion juxtapositioned in alignment with void area so as to allow for the ventilation of said hollow interior of said bag.

5. The sack according to claim 4, wherein said outer shell comprises a first, outer layer of water-resistant material, a second, inner layer of water-resistant material, and a third padding layer sandwiched between said first and second layers, each of said layers comprising said void area, said mesh portion being formed as part of one of said layers filling said void area thereof.

6. A container for carrying and transporting a surfboard, or the like, comprising:
   a main storage bag having a hollow interior defining at least one compartment for receiving therein at least one surfboard, and the like, an upper surface and a lower surface;
   at least four strap-portions, each said strap-portion having a fixed end affixed to a respective portion of said bag means and a second free end having one of male and female coupling element affixed thereto, whereby said female coupling elements may be attached to said male coupling elements;
   said bag having a reclosable opening through which may be inserted a surfboard, and the like;
   each said strap-portion further comprising hook means having a strap having a first and fixedly attached to said second end of said respective strap portion, said strap also having a second free end having a hook associated therewith, said hook means of said at least four strap-portions being used for using said bag as a roof-rack, whereby said hook means are attachable to the roof gutters of a vehicle so that said bag may be supported on the roof of a vehicle and held thereon in a safe manner;
   each said hook means comprising means for adjusting the length of the respective said strap;
   said means for adjusting the length comprising a pair of retaining loops, each said strap comprising a first doubled-over portion constituting said first end of said strap, and a second doubled-over portion constituting said second end of said strap; said first doubled-over portion having a first section thereof passing through said retaining loops at one end thereof; said first doubled-over portion having an additional layer that connects with one layer of said second doubled-over portion of said second end; of said strap;
   said second end of said strap having an extended length from the other layer thereof passing through said retaining loops at another end thereof, by which the distance of said hook from said first end of said strap may be adjusted.

7. The sack according to claim 3, wherein said outer shell comprises a first, outer layer of water-resistant material, a second, inner layer of water-resistant material, said first and second layers of water-resistant material sandwiching therebetween said padding means of said shell layer.

8. The sack according to claim 7, wherein said first, outer water-resistant layer comprises a mesh portion, each of said second, inner water-resistant layer and said padding having a void area in alignment with said mesh portion so as to allow for the ventillation of said hollow interior of said bag.

9. The sack according to claim 1, wherein each of said elongated strap portions comprises means for adjusting the length thereof with respect to said outer shell so as to adjust said strap means to individual needs.

10. The sack according to claim 1, wherein said hook means further comprises first means for adjusting the length of said secondary strap so as to position said hook at a desired distance from said second end of the respective said strap portion, in order to adapt said sack carrier to various types of vehicles.

11. The sack according to claim 10, wherein each of elongated strap portions comprises second means for adjusting the length thereof so that said second end thereof is a desired distance from the first end thereof.

12. The container according to claim 6, wherein said bag comprises an outer shell layer, a middle padding layer, and an inner shell layer; said bag further comprising a mesh portion for ventilating the interior of said bag, said mesh portion interrupting said shell and padding layers.

13. The container according to claim 12, wherein each said strap-portion further comprises a pouch for storing therein said hook when not in use; said pouch having a first closed end affixed to a portion of said second free end of the respective said strap-portion, and a second open end through which may be inserted said hook; the respective said strap-portion passing through said pouch.

14. The container according to claim 13, wherein said bag further comprises a pocket area having a reclosable flap portion formed on one of said upper and lower surfaces of said bag, said bag having a separating layer formed in the interior thereof extending substantially parallel to the axial length of said bag, and a transverse layer extending substantially transversely of said axial length to define the rear of said pocket area with said separating layer constituting the bottom of said pocket area.

15. The container according to claim 14, wherein said separating layer comprises an overlapping layer for forming a hidden pocket, said overlapping layer and the portion of said separating layer associated therewith having cooperating hook-and-pile fastening means.

16. The container according to claim 6, wherein said bag further comprises a pair of cinch straps, one said cinch strap positioned on the upper surface of said bag on the opposite side of one of said strap-portions adjacent oned end of said bag, and the other said cinch strap positioned on the upper surface of said bag on the opposite side of the other of said strap-portions adjacent the other end of said bag; each said cinch strap having means for adjusting the length thereof, and coupling means at each end thereof, whereby an additional board may be inserted and held by said cinch straps; each said cinch strap being fixedly connected to the respective portion of said bag along a portion of the length thereof, each said end thereof being free for coupling with the other said end of said cinch strap, whereby said bag may be constricted by shortening the length of said cinch straps to better contain the contents therein.

* * * * *